United States Patent
Okuno (10) Patent No.: US 7,444,077 B2
(45) Date of Patent: Oct. 28, 2008

(54) OPTICAL TRANSMISSION SYSTEM, AND PUMPING LIGHT SOURCE STOPPING DEVICE AND METHOD TO BE USED IN SAME SYSTEM

(75) Inventor: Hideki Okuno, Tokyo (JP)

(73) Assignee: NEC Corporation, Tokyo (JP)

( * ) Notice: Subject to any disclaimer, the term of this patent is extended or adjusted under 35 U.S.C. 154(b) by 357 days.

(21) Appl. No.: 11/159,124

(22) Filed: Jun. 23, 2005

(65) Prior Publication Data

US 2005/0286898 A1 Dec. 29, 2005

(30) Foreign Application Priority Data

Jun. 23, 2004 (JP) ............... 2004-184802

(51) Int. Cl.
H04B 10/08 (2006.01)
H04B 17/00 (2006.01)
(52) U.S. Cl. ............... 398/31; 398/20; 398/33; 398/37; 398/92
(58) Field of Classification Search .......... 398/20, 398/31, 33, 34, 37, 92
See application file for complete search history.

(56) References Cited

U.S. PATENT DOCUMENTS

| | | | |
|---|---|---|---|
| 5,864,423 A | 1/1999 | Kosaka | |
| 6,160,649 A | 12/2000 | Horiuchi et al. | |
| 6,681,079 B1 * | 1/2004 | Maroney | 398/15 |
| 6,807,001 B1 * | 10/2004 | Ranka et al. | 359/341.3 |
| 2002/0114060 A1 * | 8/2002 | Kobayashi et al. | 359/334 |
| 2002/0131129 A1 * | 9/2002 | Mao | 359/161 |
| 2004/0213567 A1 * | 10/2004 | Deguchi et al. | 398/32 |
| 2005/0041968 A1 * | 2/2005 | Takahashi | 398/30 |

FOREIGN PATENT DOCUMENTS

| | | |
|---|---|---|
| CN | 1155674 | 7/1997 |
| JP | 2002-182253 | 6/2002 |
| JP | 2003-32192 | 1/2003 |
| JP | 2003-46457 | 2/2003 |
| JP | 2003-218796 | 7/2003 |
| JP | 2003-264509 | 9/2003 |

* cited by examiner

*Primary Examiner*—Jason Chan
*Assistant Examiner*—Nathan M Curs
(74) *Attorney, Agent, or Firm*—Young & Thompson (57) ABSTRACT

An optical transmission system includes an optical signal transmitter to output optical signal, a monitoring light transmitter to generate monitoring light, an optical multiplexer to output a multiplexed signal light by multiplexing the optical signal and monitoring light, an optical relay transmission path to amplify the multiplexed signal light by using a Raman amplification effect, an optical demultiplexer to demultiplex the multiplexed signal light, a monitoring light receiver to receive the monitoring light output from the optical demultiplexer, and a pumping light source stopping device to continuously monitor a transmission state of the monitoring light and, when the transmission of the monitoring light is interrupted, to stop emission of the pumping light from the pumping light source to be used for distributed Raman amplification.

18 Claims, 4 Drawing Sheets

OPTICAL TRANSMISSION SYSTEM, AND PUMPING LIGHT SOURCE STOPPING DEVICE AND METHOD TO BE USED IN SAME SYSTEM

BACKGROUND OF THE INVENTION

1. Field of the Invention

The present invention relates to an optical transmission system, and a pumping light source stopping device and method to be used in same system, and more particularly to the optical transmission system being suitably used to ensure safety from dangerous highly output light being radiated at time of attachment and detachment of connectors, breakage of optical fibers, or a like, and a pumping light source stopping device and method to be used in same system.

The present application claims priority of Japanese Patent Application No. 2004-184802 filed on Jun. 23, 2004, which is hereby incorporated by reference.

2. Description of the Related Art

In recent years, due to widespread use of the Internet or a like, amounts of information required to be transmitted have increased greatly. In a WDM (Wavelength Division Multiplexing) transmission system out of such optical transmission systems as used in the above cases, in order to transmit a plurality of pieces of data, by utilizing a property that light waves having different wavelengths do not interfere with each other, a multiplexed signal light obtained by multiplexing a plurality of optical data signal waves, each carried by a corresponding one of carrier light waves each having a different wavelength, is transmitted through one optical fiber cable. By doing so, it is made possible to dramatically increase amounts of information that can be transmitted by one optical fiber cable when compared with a case in which each piece of data is transmitted by an individual optical fiber cable. In the optical fiber cable between a signal transmitting device and a signal receiving device used in the WDM transmission system, the multiplexed signal light is attenuated and, therefore, amplification and correction of the multiplexed signal light is required. As a result, conventionally, an optical fiber amplifier contains a trace element such as Erbium or a like. However, since there is a limit to a wavelength band in which an optical signal can be amplified and to a light transmission capacity, use of a Raman amplifier increases in recent years. The Raman amplifier, by using Raman scattering (physical phenomenon), has a characteristic to amplify signal light having a wavelength being longer by 100 nm than that of pumping light and, therefore, the effect of amplifying signal light in almost all the wavelength bands can be obtained.

Figure 3:
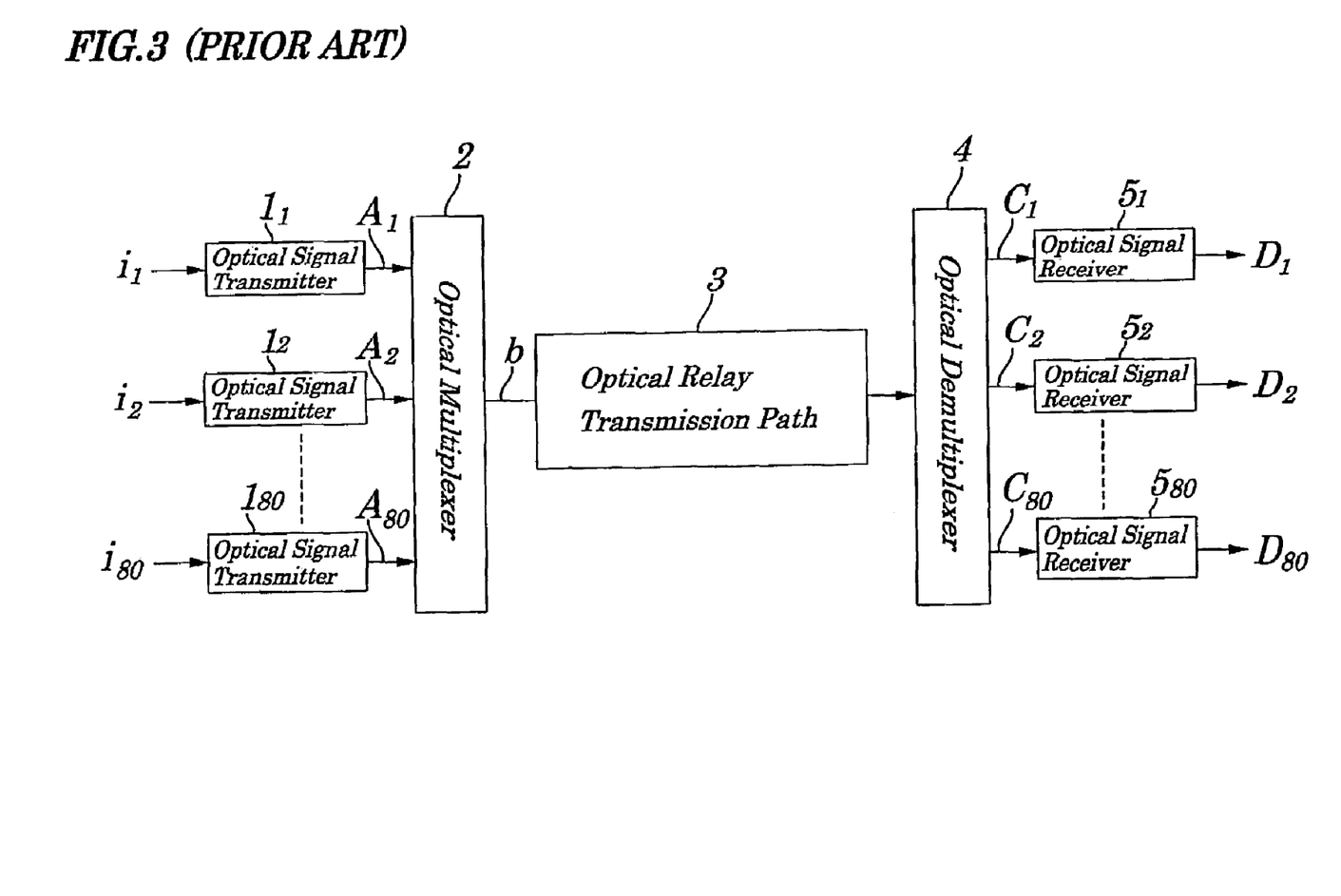
FIG. 3 is a block diagram showing configurations of a conventional WDM transmission system.

The conventional WDM transmission system, as shown in FIG. 3, is so configured that optical signal transmitters $1_1$, $1_2$, ..., $1_{80}$, an optical multiplexer 2, an optical relay transmission path (wherein a relay device is included) 3, an optical demultiplexer 4, and optical signal receivers $5_1$, $5_2$, ..., $5_{80}$ are connected by an optical fiber. The optical signal transmitters $1_1$, $1_2$, ..., $1_{80}$ receive input electrical signals $i_1$, $i_2$, ..., $i_{80}$, respectively, and modulate eighty channels of carrier light waves having different wavelengths by using the input electrical signals $i_1$, $i_2$, ..., $i_{80}$, respectively to generate optical signals $A_1$, $A_2$, ..., $A_{80}$ to be transmitted over (via) eighty channels. The optical multiplexer 2 generates a multiplexed signal light "b" in a form of one light bundle which is obtained by wavelength-division- multiplexing of light signals $A_1$, $A_2$, ..., $A_{80}$ transmitted over (via) eighty channels into a wavelength range between about 1574 nm and about 1609 nm. The multiplexed signal light "b" is transmitted through the optical relay transmission path 3. The optical demultiplexer 4 generates, by demultiplexing the multiplexed signal light "b" received from the optical relay transmission path 3, optical signals $C_1$, $C_2$, ..., $C_{80}$ to be received via eighty channels. The optical signal receiver $5_1$, $5_2$, ..., $5_{80}$ receive the optical signals $C_1$, $C_2$, ..., $C_{80}$ to be received and demodulate electrical signals $D_1$, $D_2$, ..., $D_{80}$ to be output via eighty channels.

Figure 4:
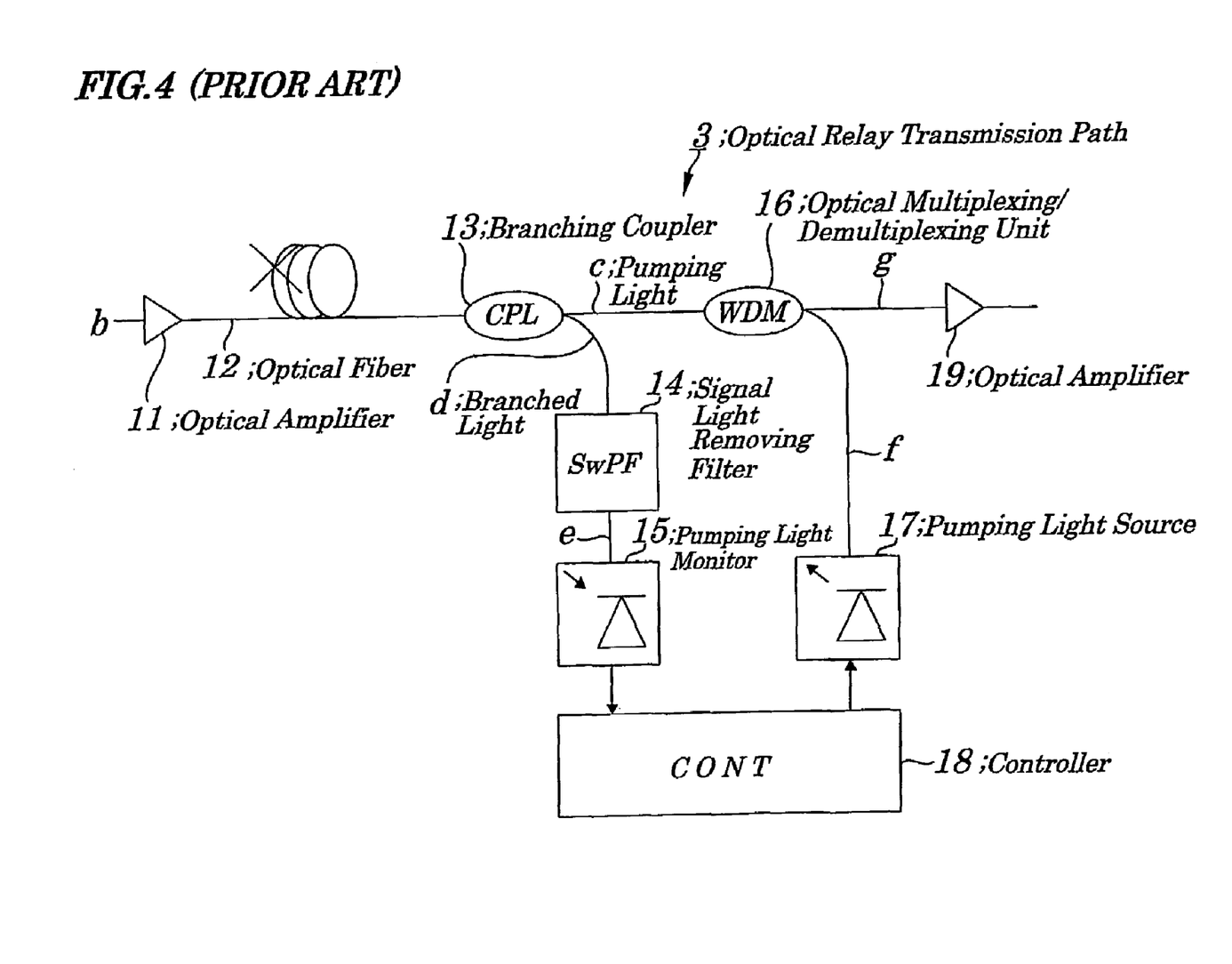
FIG. 4 is a diagram showing configurations of the relay transmission circuit shown in FIG. 3.

FIG. 4 is a diagram showing configurations of the optical relay transmission path 3 shown in FIG. 3. The optical relay transmission path 3, as shown in FIG. 4, includes an optical amplifier 11, an optical fiber 12, a branching coupler (CPL) 13, a signal light removing filter (SwPF) 14, a pumping light monitor 15, an optical multiplexing/demultiplexing unit (WDM) 16, a pumping light source 17, a controller (COUNT) 18, a controller (COUNT) 18, and an optical amplifier 19.

The optical amplifier 11 amplifies a multiplexed signal light "b" in a manner to obtain a specified gain. The optical fiber 12 is made up of a dispersion shift fiber having a length of about 80 km and has an optical loss being about 20 dB, which is used to transmit the multiplexed signal light "b" obtained by amplification in the optical amplifier 11. The branching coupler (CPL) 13 is an optical fiber fusion type passive component which causes pumping light transmitted through the optical fiber 12 to branch into pumping light "c" to be transmitted to the optical multiplexing/demultiplexing unit 16 and into branched light "d" to be transmitted to the signal light removing filter 14 at a rate. of 95% and 5% respectively. The signal light removing filter 14 is a micro-optics type optical passive component, which removes signal light from the branched light and outputs pumping light "e". The pumping light monitor 15 is made up of photodiodes and detects the pumping light "e". The pumping light source 17 is made up of parts including semiconductor laser diodes and emits pumping light "f" for distributed Raman amplification of about 1 W in a wavelength band of 1.48 µm.

The optical multiplexing/demultiplexing unit 16 is a micro-optics type optical passive component which outputs multiplexed pumping light "g" obtained by multiplexing the pumping light "c" to be output from the branching coupler 13 and the pumping light "f" to be output from the pumping light source 17. The optical amplifier 19 amplifies the multiplexed pumping light "g" in a manner to obtain a specified gain. The controller 18 makes an operation of the pumping light source 17 stop instantaneously when the pumping light "e" having a specified value is detected by the pumping light monitor 15. For example, when an optical connector (not shown) used in relaying for the optical fiber 12 is broken due to maintenance work or a like, the pumping light "e" having a transmitting energy level of 1 W (=+30 dBm) is radiated from the above optical connector. This light radiation is dangerous for a maintenance worker and, therefore, it is desirous to instantaneously stop operations of the pumping light source 17. When the optical connector is disconnected, Fresnel reflection with a return loss of about 14 dB occurs at its end, the pumping light "e" of about +16 dBm returns back to the optical fiber 12. At this time point, since the pumping light "e" is detected by the pumping light monitor 15, operations of the pumping light source 17 is instantaneously stopped.

In addition to the above WDM transmission system, various conventional technologies of this-type are disclosed in, for example, Japanese Patent Application Laid-open Nos. 2002-182253 (patent reference 1), 2003-032192 (patent reference 2), 2003-218796 (patent reference 3), 2003-264509 (patent reference 4), and a like.

In the optical transmission system disclosed in the patent reference 1 (Abstract, FIG. 1), pumping light is supplied by a pumping light supplying means to an optical fiber and signal light traveling through the optical fiber is Raman-amplified. Power of Raman-amplified signal light is detected by a signal light power detecting means and whether or not supply of pumping light to the optical fiber should be stopped is judged by a judging means according to the power of signal light. If it is judged that the supply of pumping light should be stopped, the supply of the pumping light to the optical fiber is stopped. This can prevent the pumping light for Raman amplification from leaking to the outside and enables reduction of a danger caused by the leaked pumping light.

In the optical transmission system disclosed in the patent reference 2 (Abstract, FIG. 1), a terminal device transmits a monitoring signal made up of monitoring instruction signals and response carrier signals. Each of the monitoring instruction signals and response carrier signals has a different light wavelength. The relay device configured to perform light amplification using an optical fiber as an optical fiber transmission line generates a response signal obtained by superimposing response information on a response carrier and then transmits the response signal to the terminal device. Due to this, even if a line failure occurs in the vicinity of the relay device, it is made possible to exercise monitoring control, which improves reliability.

In the optical transmission system disclosed in the patent reference 3 (Abstract, FIG. 1), when a light signal loss in an optical fiber is detected by a light signal discontinuation detecting means, pumping light being supplied from a pumping light source is interrupted by a pumping light interrupting means and, therefore, even in a system using distributed Raman amplification, pumping light is interrupted automatically and rapidly at time of breakage of a fiber and of attachment and detachment of a connector.

In an optical communication module disclosed in the patent reference 4 (page 8, FIG. 2), signal light is transmitted from a signal transmitter with monitoring light being added thereto and, when monitoring light (light for detecting fiber bending) comes not to be detected by a signal receiver at time of breakage of a fiber and of attachment and detachment of a connector, supply of pumping light is stopped. A wavelength of the monitoring light is set at a U band (for example, 1625 nm to 1675 nm) while a wavelength of signal light is set at a C band (for example, 1530 nm to 1565 nm), or L band (for example, 1625 nm to 1675 nm). Moreover, even if a light interrupting device fails, a maintenance worker is made to recognize leakage of light by using visible rays. Even if bending of an optical fiber occurs, a highly sensitive function of interrupting light can be achieved. This enables safety of operations of a high-output optical fiber communication system to be maintained and needless consumption of energy to be suppressed.

However, such conventional optical transmission systems as described above have problems. That is, in the conventional WDM transmission system shown in FIG. 4, even when the optical connector is connected therein, small reflection with a return loss of about 25 dB occurs and, therefore, when pumping light of about +5 dBm has already returned back to the optical fiber 12, it is necessary to set the controller so as not to stop operations of the pumping light source 17. Here, if breakage (shown by the X mark in FIG. 4) of the optical fiber 12 occurs at a distance of a transmission attenuation of 10 dB or so from a Raman light source, pumping light having a transmitting energy level of 1 W (=+30 dBm) incurs a loss of 10 dB and pumping light of +20 dBm is radiated from the place where the breakage of the optical fiber 12 has occurred. Such radiation is dangerous and, therefore, it is desirous to instantaneously stop the pumping light source 17. When the optical fiber 12 is broken, Fresnel reflection occurs at an end of the optical fiber 12 and, therefore, light incurs a loss of 20 dB which includes losses occurring in both going and returning courses between the end of the optical fiber and the position where the breakage has occurred and, as a result, pumping light of about −4 dBm returns-back to the Raman light source. Since the energy level of −4 dBm is smaller than that of about +5 dBm, operations of the Raman light source (pumping light source 17) do not stop. As described above, the conventional WDM transmission system has the problem in that, since the breakage of the optical fiber 12 or a like is detected by the pumping light reflected at an end of the broken portion, operations of the pumping light source 17 do not stop instantaneously and dangerous high output light is radiated from the end face.

Moreover, the conventional optical transmission system disclosed in the patent reference 1, since it is so configured that power of Raman-amplified signal light is detected by a signal light power detecting means, has the same problem as in the WDM transmission system shown in FIG. 3. Also, the conventional optical transmission system disclosed in the patent reference 2, since it is so configured that a monitoring signal made up of monitoring instruction signals and response carrier signals each having a different optical wavelength is transmitted, has the problem in that configurations of the optical transmission system become complicated. Also, the conventional optical transmission system disclosed in the patent reference 3, since it is so configured that a loss in an optical signal in the optical fiber is detected by the light signal discontinuation detecting means, has the same problems as in the WDM transmission system shown in FIG. 3. Furthermore, in the optical communication module disclosed in the patent reference 4, the object of the invention is to take countermeasures against bending of optical fibers, which is different from that of the present invention.

SUMMARY OF THE INVENTION

In view of the above, it is an object of the present invention to provide an optical transmission system, and a pumping light source stopping device and method to be used in same system, which are capable of preventing a dangerous high output light from being radiated in order to ensure safety by stopping operations of a pumping light source when a connector is attached and detached or an optical fiber is broken.

According to a first aspect of the present invention, there is provided an optical transmission system including:

an optical signal transmitter to output an optical signal;

a monitoring light transmitter to output a monitoring light having a wavelength being different from a wavelength of the optical signal;

an optical multiplexer to generate and output a multiplexed signal light by multiplexing the optical signal and the monitoring light;

an optical relay transmission path to amplify and transmit the multiplexed signal light with a Raman amplification effect exerted by pumping light output from a pumping light source to be used for distributed Raman amplification;

an optical demultiplexer to demultiplex the multiplexed signal light transmitted through the optical relay transmission path for every wavelength and to output the optical signal separated from the monitoring light;

an optical signal receiver to receive the optical signal output from the optical demultiplexer; and a pumping light source stopping device to continuously monitor a transmission state of the monitoring light and, when the transmission of the monitoring light is interrupted, to stop emission of the pumping light from the pumping light source to be used for distributed Raman amplification.

In the foregoing first aspect, a preferable mode is one wherein the optical signal transmitter generates and outputs the optical signal by modulating a specified carrier light wave which have a specified wavelength with a specified electrical signal; and wherein the monitoring light transmitter generates and outputs the monitoring light by modulating an additional carrier light wave having a wavelength being different from the specified wavelength of the carrier light wave with an electrical monitoring signal having a frequency being lower than that of the specified electrical signal.

Also, a preferable mode is one wherein the optical relay transmission path includes:

an optical fiber to transmit the multiplexed signal light;

the pumping light source to generate the pumping light to be used for distributed Raman amplification; and an optical multiplexing/demultiplexing unit to supply the pumping light output from the pumping light source to the optical fiber, and wherein the pumping light stopping device includes;

an optical branching device to optically branch the multiplexed signal light;

a monitoring light passing filter to pass the monitoring light included in the branched multiplexed signal light and remove the optical signal components therein;

a monitoring light detector to detect the monitoring light having passed through the monitoring light passing filter; and a controller to turn off the pumping light source when the monitoring light comes not to be detected.

Furthermore, preferable mode is one wherein the pumping light stopping device includes;

an optical branching device to optically branch the multiplexed signal light;

a monitoring light passing filter to pass the monitoring light included in the branched multiplexed signal light and remove the optical signal components therein;

a monitoring light detector to receive passing light having passed through the monitoring light passing filter, and to detect the monitoring light by demodulating the received passing light into the electrical monitoring signal; and a controller to turn off the pumping light source when the monitoring light comes not to be detected.

According to a second aspect of the present invention, there is provided a pumping light source stopping device to be used in an optical transmission system including: an optical signal transmitter to output an optical signal; a monitoring light transmitter to output a monitoring light having a wavelength being different from a wavelength of the optical signal; an optical multiplexer to generate and output a multiplexed signal light by multiplexing the optical signal and the monitoring light; an optical relay transmission path to amplify and transmit the multiplexed signal light with a Raman amplification effect exerted by pumping light output from a pumping light source to be used for distributed Raman amplification; an optical demultiplexer to demultiplex the multiplexed signal light transmitted through the optical relay transmission path for every wavelength and to output the optical signal separated from the monitoring light; and an optical signal receiver to receive the optical signal output from the optical demultiplexer, the pumping light source stopping device to continuously monitor a transmission state of the monitoring light and, when the transmission of the monitoring light is interrupted, to stop emission of the pumping light from the pumping light source to be used for distributed Raman amplification.

According to a third aspect of the present invention, there is provided an optical transmission system including:

n-pieces of optical signal transmitters being mounted in a manner to correspond to n-pieces ("n" is a positive integer) of channels in a one-to-one relationship, the n-pieces of which each generate and output an optical signal by modulating a corresponding one of carrier light waves which have different wavelengths and are assigned to the channels in a one-to-one relationship, with a corresponding electrical signal;

at least one monitoring light transmitter to generate and output a monitoring light by modulating an additional carrier light wave having a wavelength being different from each of the wavelengths of the carrier light waves with an electrical monitoring signal;

an optical multiplexer to generate and output a multiplexed signal light by multiplexing the optical signals corresponding to the n-pieces of channels and the monitoring light;

an optical relay transmission path to amplify and transmit the multiplexed signal light with a Raman amplification effect exerted by pumping light output from a pumping light source to be used for distributed Raman amplification;

an optical demultiplexer to demultiplex the multiplexed signal light transmitted through the optical relay transmission path for every wavelength and to output separately the optical signals corresponding to the n-pieces of channels, separated from the monitoring light;

n-pieces of optical signal receivers each being mounted in a manner to correspond to each of n-pieces ("n" is a positive integer) of channels in a one-to-one relationship, the n-pieces of which each receive the corresponding optical signal output from the optical demultiplexer and demodulate the received optical signal into the electrical signal; and a pumping light source stopping device to continuously monitor a transmission state of the monitoring light and, when the transmission of the monitoring light is interrupted, to stop emission of the pumping light from the pumping light source to be used for distributed Raman amplification.

In the foregoing third aspect, a preferable mode is one wherein the optical relay transmission path includes:

an optical fiber to transmit the multiplexed signal light;

the pumping light source to generate the pumping light to be used for distributed Raman amplification; and an optical multiplexing/demultiplexing unit to supply the pumping light output from the pumping light source to the optical fiber, and wherein the pumping light stopping device includes;

an optical branching device to optically branch the multiplexed signal light;

a monitoring light passing filter to pass the monitoring light included in the branched multiplexed signal light and remove the optical signal components therein;

a monitoring light detector to receive passing light having passed through the monitoring light passing filter, and to detect the monitoring light by demodulating the received passing light into the electrical monitoring signal; and a controller to turn off the pumping light source when the monitoring light comes not to be detected.

An additional preferable mode is one wherein the electrical monitoring signal has a frequency being lower than that of the electrical signal carried by each of the carrier light waves.

According to a fourth aspect of the present invention, there is provided a pumping light source stopping device to be used in an optical transmission system including: n-pieces of optical signal transmitters being mounted in a manner to correspond to n-pieces ("n" is a positive integer) of channels in a one-to-one relationship, the n-pieces of which each generate and output an optical signal by modulating a corresponding one of carrier light waves which have different wavelengths and are assigned to the channels in a one-to-one relationship, with a corresponding electrical signal; at least one monitoring light transmitter to generate and output a monitoring light by modulating an additional carrier light wave having a wavelength being different from each of wavelengths of the carrier light waves with an electrical monitoring signal; an optical multiplexer to generate and output a multiplexed signal light by multiplexing the optical signals corresponding to the n-pieces of channels and the monitoring light; an optical relay transmission path to amplify and transmit the multiplexed signal light with a Raman amplification effect exerted by pumping light output from a pumping light source to be used for distributed Raman amplification; an optical demultiplexer to demultiplex the multiplexed signal light transmitted through the optical relay transmission path for every wavelength and to output separately the optical signals corresponding to the n-pieces of channels, separated from the monitoring light; n-pieces of optical signal receivers each being mounted in a manner to correspond to each of n-pieces ("n" is a positive integer) of channels in a one-to-one relationship, the n-pieces of which each receive the corresponding optical signal output from the optical demultiplexer and demodulate the received optical signal into the electrical signal; and the pumping light source stopping device to continuously monitor a transmission state of the monitoring light and, when the transmission of the monitoring light is interrupted, to stop emission of the pumping light from the pumping light source to be used for distributed Raman amplification.

According to a fifth aspect of the present invention, there is provided a pumping light source stopping method to be used for an optical transmission system including: n-pieces of optical signal transmitters being mounted in a manner to correspond to n-pieces ("n" is a positive integer) of channels in a one-to-one relationship, the n-pieces of which each generate and output an optical signal by modulating a corresponding one of carrier light waves which have different wavelengths and are assigned to the channels in a one-to-one relationship, with a corresponding electrical signal; at least one monitoring light transmitter to generate and output a monitoring light by modulating an additional carrier light wave having a wavelength being different from each of wavelengths of the carrier light waves with an electrical monitoring signal; an optical multiplexer to generate and output a multiplexed signal light by multiplexing the optical signals corresponding to the n-pieces of channels and the monitoring light; an optical relay transmission path to amplify and transmit the multiplexed signal light with a Raman amplification effect exerted by pumping light output from a pumping light source to be used for distributed Raman amplification; an optical demultiplexer to demultiplex the multiplexed signal light transmitted through the optical relay transmission path for every wavelength and to output separately the optical signals corresponding to the n-pieces of channels, separated from the monitoring light; n-pieces of optical signal receivers each being mounted in a manner to correspond to each of n-pieces ("n" is a positive integer) of channels in a one-to-one relationship, the n-pieces of which each receive the corresponding optical signal output from the optical demultiplexer and demodulate the received optical signal into the electrical signal; and the pumping light source stopping method including the steps of:

monitoring continuously a transmission state of the monitoring light and, and stopping emission of the pumping light from the pumping light source to be used for distributed Raman amplification, when the transmission of the monitoring light is interrupted.

In the foregoing fifth aspect, a preferable mode is one wherein that includes a step of judging that the transmission of the monitoring light is interrupted, when a received light has been not demodulated into the electrical monitoring signal.

With the above configuration, by mounting one or a plurality of monitoring light transmitters which generates monitoring light modulated by a electrical monitoring signal having a frequency being lower than that of an input electrical signal to continuously monitor a transmission state of monitoring light using a pumping light source stopping device and, by stopping emission of pumping light by the pumping light source for distributed Raman amplification when the transmission of one monitoring light is stopped, the optical transmission system which can ensure safety even if configuration of the system is comparatively simple.

With another configuration as above, the monitoring frequency is set at a frequency being lower than that the input electrical signals and, therefore, the monitoring frequency component can be removed by the monitoring light passing filter.

As a result, it is made possible to instantaneously and very accurately stop operations of the pumping light and to ensure safety from dangerous highly output light being radiated at time of attachment and detachment of connectors, breakage of optical fibers, or a like.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Embodiment

Figure 1:
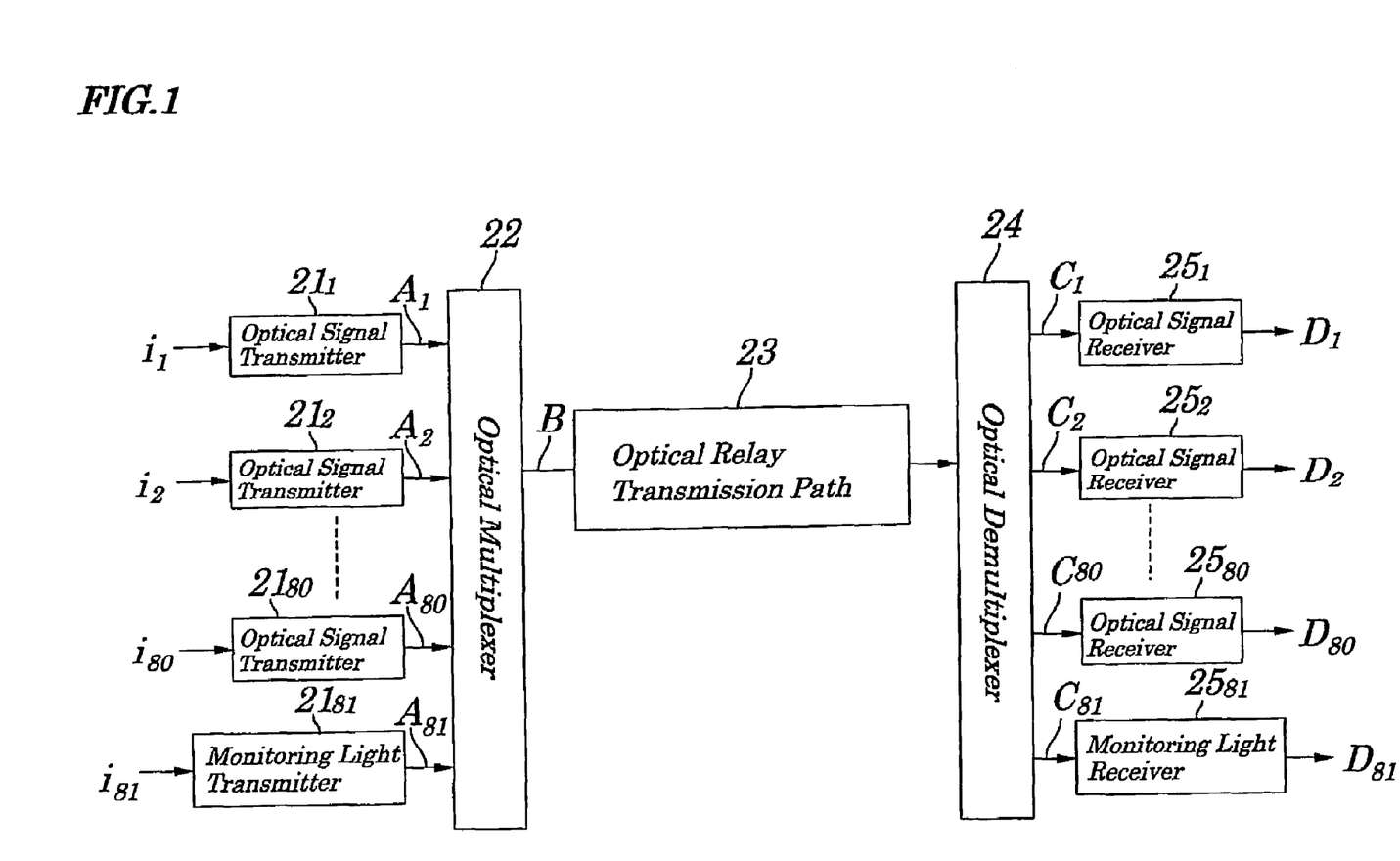
FIG. 1 is a block diagram showing configurations of an optical transmission system of an embodiment of the present invention.

FIG. 1 is a block diagram showing configurations of an optical transmission system of an embodiment of the present invention.

The optical transmission system of the embodiment, as shown in FIG. 1, is a WDM transmission system which includes optical signal transmitters $21_1$, $21_2$, ..., $21_{80}$, a monitoring light transmitter $21_{81}$, an optical multiplexer 22, an optical relay transmission path 23, an optical demultiplexer 24, optical signal receivers $25_1$, $25_2$, ..., $21_{80}$, and a monitoring light transmitter $25_{81}$. The optical signal transmitters $21_1, 21_2, \ldots, 21_{80}$ receive input electrical signals $i_1, i_2, i_3, \ldots, i_{80}$ respectively and generate optical signals $A_1, A_2, \ldots, A_{80}$ each to be transmitted through a corresponding one of eighty channels, by modulating eighty channels of carrier light waves which have different wavelengths respectively using a corresponding one of the input electrical signals $i_1, i_2, i_3, \ldots, i_{80}$. The monitoring light transmitter $21_{81}$ generates monitoring light (may be referred to as optical monitoring signal) $A_{81}$ which has wavelengths being different from those of the optical signals $A_1, A_2, \ldots, A_{80}$ to be transmitted and which is demodulated by electrical monitoring signal $i_{81}$ having a frequency being lower than that of each of the input electrical signals $i_1, i_2, \ldots, i_{80}$. In the optical transmission system of the embodiment, a frequency of the electrical monitoring signal $i_{81}$ is set as a low frequency signal having a specified frequency (for example, about 8 MHz) (hereinafter, called a "tone frequency"). Here, the tone frequency simply means that the frequency is lower than that of each of the input electrical signals $i_1, i_2, \ldots, i_{80}$. The optical multiplexer 22 generates a multiplexed signal light "B" in a form of one light bundle which is obtained by wavelength-division- multiplexing of light signals $A_1, A_2, \ldots, A_{80}$ transmitted via eighty channels into a wavelength range between about 1574 nm and about 1609 nm. The optical relay transmission path 23 transmits the multiplexed signal light "B" by using a Raman amplification effect achieved by pumping light emitted from a distributed Raman amplification pumping light source and continuously monitors a transmitting state of the monitoring light $A_{81}$ and, when the transmission of the monitoring light $A_{81}$ is stopped, emission of the pumping light from the distributed Raman amplification pumping light source is stopped. The optical demultiplexer 24 demultiplexes the multiplexed signal light "B" transmitted through the optical relay transmission path for every wavelength and generates optical signals $C_1, C_2, \ldots, C_{80}$ and monitoring light $C_{81}$. The optical signal receivers $25_1, 25_2, \ldots, 25_{80}$ receive the optical signals $C_1, C_2, \ldots, C_{80}$ to be received and demodulate the received optical signals $C_1, C_2, \ldots, C_{80}$ into electrical signals $D_1, D_2, \ldots, D_{80}$ to be output via eighty channels. The monitoring light receiver $25_{81}$ receives the monitoring light $C_{81}$ and demodulates the received monitoring light $C_{81}$ into a electrical monitoring signal $D_{81}$.

Figure 2:
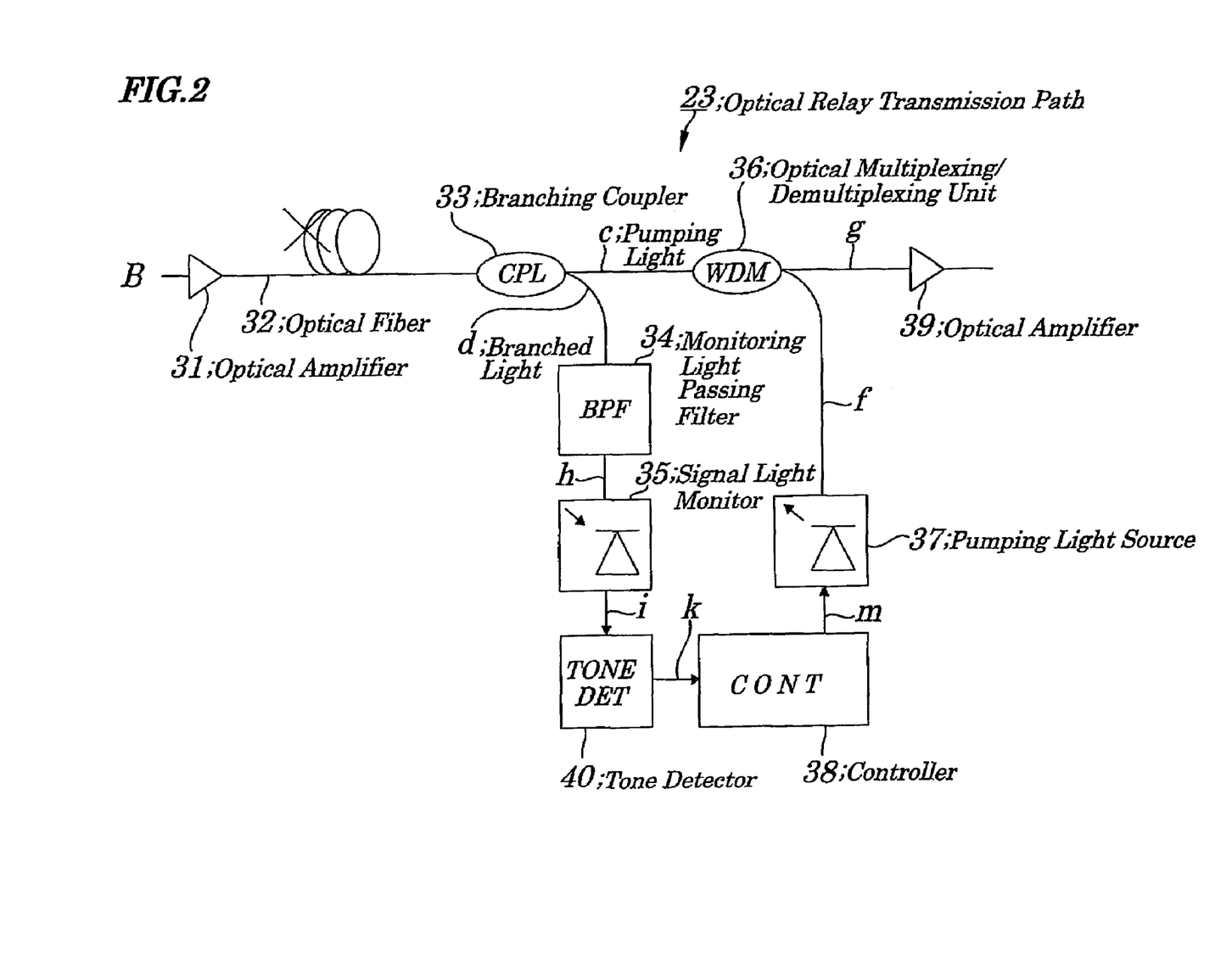
FIG. 2 is a diagram showing configurations of the optical relay transmission path shown in FIG. 1.

FIG. 2 is a diagram showing configurations of the optical relay transmission path shown in FIG. 1.

The optical relay transmission path 23, as shown in FIG. 2, includes an optical amplifier 31, an optical fiber 32, a branching coupler (CPL) 33, a monitoring light passing filter (BPF) 34, a signal light monitor 35, an optical multiplexing/demultiplexing (WDM) unit 36, a pumping light source 37, a controller (CONT) 38, an optical amplifier 39, and a tone detector (TONE DET) 40.

The optical amplifier 31 amplifies a multiplexed signal light "B" in a manner to obtain a specified gain. The optical fiber 32 is made up of a dispersion shift fiber having a length of about 80 km and has an optical loss being about 20 dB, which is used to transmit the multiplexed signal light "B" obtained by amplification in the optical amplifier 31. The branching coupler (CPL) 33 is an optical fiber fusion type passive component which takes out a part of the multiplexed signal light "B" transmitted through the optical fiber 32 as branched light "d", which causes pumping light transmitted through the optical fiber 32 to branch into pumping light "c" to be transmitted to the optical multiplexing/demultiplexing unit 36 and into branched light "d" to be transmitted to the monitoring light passing filter 34 at the rate of 95% and 5% respectively. The monitoring light passing filter 34 is a micro-optics type optical passive component, which removes pumping light, noise light, and optical signals $A_1, A_2, \ldots, A_{80}$ transmitted via eighty channels and takes out only a frequency component "h" for monitoring the monitoring light $A_{81}$. The signal light monitor 35 is made up of photodiodes and converts a monitoring frequency component "h" taken from the monitoring light passing filter 34 into a electrical monitoring signal "j". The tone detector 40 generates a detection signal "k" at time when the monitoring frequency component "h" from a electrical monitoring signal "j" is-detected. The pumping light source 37 is made up of parts including semiconductor laser diodes and pumps pumping light "f" for distributed Raman amplification having light energy of about 1 w in a wavelength band of, for example, 1.48 µm. The optical multiplexing/demultiplexing unit 36 is a micro-optic type optical passive component which supplies the pumping light "f" for distributed Raman amplification pumped from the pumping light source 37 to the optical fiber 32 and allows the pumping light "c" to be passed and outputs multiplexed pumping light "f" obtained by multiplexing the pumping light "c" to be output from the branching coupler 33 and the pumping light "f" to be output from the pumping light source 37. The optical amplifier 39 amplifies multiplexed pumping light "g" in a manner to obtain a specified gain and transmits the amplified light to the optical demultiplexer 24 shown in FIG. 1. The controller 38, when the detecting signal "k" is not generated by the tone detector 40, instantaneously stops the pumping light source 37 by using a control signal "m".

For example, if breakage of the optical fiber 32 occurs at a distance of a transmission attenuation of 10 dB or so from a Raman light source, pumping light having a transmitting energy level of 1 W (=+30 dBm) incurs a loss of 10 dB and pumping light of +20 dBm is radiated from the place where the breakage of the optical fiber 32 has occurred. This light radiation light is dangerous for a maintenance worker and, therefore, it is desirous to instantaneously stop operations of the pumping light source 37. If breakage of the optical fiber 32 occurs, since the optical multiplexing signal/monitoring light "B" is not carried, a modulated component in a tone frequency comes not to be detected instantaneously by the tone detector 40 and, therefore, operations of the pumping light source 37 is instantaneously stopped by the controller 38. The above branching coupler 33, monitoring light passing filter 34, signal light monitor 35, controller 38, and the tone detector 40 make up a pumping light stopping device.

Next, a method for stopping operations of the pumping light source to be used in the WDM transmission system of the embodiment is described by referring to FIG. 1 and FIG. 2.

In this method, transmission of monitoring light $C_{81}$ is continuously monitored and, when the transmission of the monitoring light $C_{81}$ is stopped, emission of the pumping light "f" for distributed Raman amplification is stopped. That is, the input electrical signals $i_1, i_2, \ldots, i_{80}$ are input to the optical signal transmitters $21_1, 21_2, \ldots, 21_{80}$ respectively and optical signals $A_1, A_2, \ldots, A_{80}$ to be transmitted via eighty channels is generated by modulation of carrier light waves having different wavelengths to be carried via eighty channels using the input electrical signals $i_1, i_2, \ldots, i_{80}$. Also, electrical monitoring signal $i_{81}$ is input to the monitoring light transmitter $21_{81}$, from which monitoring light $A_{81}$ modulated by the electrical monitoring signal $i_{81}$ is output. The process of wavelength-division-multiplexing on the optical signals $A_1, A_2, \ldots, A_{80}$ and monitoring light $A_{81}$ to be transmitted is performed by the optical multiplexer 22 and a multiplexed signal light "B" is output from the optical multiplexer 22. The multiplexed signal light "B" is amplified by the optical amplifier 31 and is transmitted by the optical fiber 32. The multiplexed/monitoring light "B" to be transmitted is branched into pumping light "c" and branching light "d" by the branching coupler 33. Pumping light "c" is output through the optical multiplexing/demultiplexing unit 36 as multiplexed pumping light "g" which is then amplified by the optical amplifier 39 and transmitted to the optical demultiplexer 24. In the optical demultiplexer 24, the multiplexed pumping light "g" amplified by the optical amplifier 39 is demultiplexed for every wavelength and optical signals $C_1, C_2, \ldots, C_{80}$ to be received via eighty channels and monitoring light $C_{81}$ are generated. The optical signals $C_1, C_2, \ldots, C_{80}$ is received by the optical signal receivers $25_1, 25_2, \ldots, 25_{80}$ and is demodulated into electrical signals $D_1, D_2, \ldots, D_{80}$ to be output via eighty channels. The monitoring light $C_{81}$ is received by the monitoring light receiver $25_{81}$ and is demodulated into a electrical monitoring signal $D_{81}$.

On the other hand, the branching light "d" is input to the monitoring light passing filter 34 where pumping light, noise light, light signal $A_1, A_2, \ldots, A_{80}$ to be transmitted and only monitoring frequency component "h" of the monitoring light $A_{81}$ is taken out from the monitoring light passing filter 34. The monitoring frequency component "h" is converted into a electrical monitoring signal "j" by the signal light monitor 35. The electrical monitoring signal "j" is transmitted to the tone detector 40 from which a detecting signal "k" is output. At this time point, for example, if breakage of the optical fiber 32 occurs, the multiplexed signal light "B" is not carried and, therefore, the detecting signal "k" is not generated, which causes the controlling signal "m" to be output from the controller 38 and operations of the pumping light source 37 to be instantaneously stopped.

As described above, according to the optical transmission system of the present invention, when the detecting signal "k" for the monitoring frequency component "h" is not generated by the tone detector 40, operations of the pumping light source 37 are instantaneously stopped by a controlling signal "m" to be output from the controller 38 and, therefore, safety can be ensured even if configurations of the system are comparatively simple. Also, pumping light, noise light, and optical signals $A_1, A_2, \ldots, A_{80}$ to be transmitted are removed by the monitoring light passing filter 34 from the branching light "d" and the monitoring frequency component "h" is set at a frequency being lower than that of the input electrical signals $i_1, i_2, \ldots, i_{80}$ and, therefore, the monitoring frequency component "h" can be taken out with high accuracy. As a result, operations of the pumping light source 37 are instantaneously stopped with high accuracy which ensures safety from dangerous highly output light being radiated at time of attachment and detachment of connectors, breakage of optical fibers, or a like.

It is apparent that the present invention is not limited to the above embodiments but may be changed and modified without departing from the scope and spirit of the invention. For example, in FIG. 1, one piece of the monitoring light transmitter is provided in the optical transmission system, however, a plurality of the monitoring light transmitters may be mounted. In this case, it is necessary that a plurality of the monitoring light receiver $25_{81}$, monitoring light passing filter (BPF) 34, signal light monitor 35, and tone detectors 40 is also installed so as to correspond to the number of the monitoring light transmitters $21_{81}$. By configuring so, operations of the pumping light source 37 can be instantaneously stopped more reliably. The frequency of the electrical monitoring signal is not limited to 8 MHz. That is, so long as the frequency of the electrical monitoring signal is lower than that of the input electrical signals $i_1, i_2, \ldots, i_{80}$, any frequency may be employed. Moreover, in the above embodiment, the system is so configured that the electrical signals $i_1, i_2, \ldots, i_{80}$ to be transmitted via eighty channels are input to the optical signal transmitters $21_1, 21_2, \ldots, 21_{80}$, however, the number of the channels may be set at any number of channels being one or more.

Furthermore, the present invention can be applied to general optical transmission systems to transmit signal light by using a Raman amplification effect achieved by pumping light emitted from the distributed pumping light source. Also, although a pumping light stopping device is provided in the optical relay transmission path 23, a pumping light stopping device may be provided, for example, in a monitoring light transmitter $25_{81}$ or a like.

What is claimed is:

1. An optical transmission system comprising:
   an optical signal transmitter to output an optical signal;
   a monitoring light transmitter to output a monitoring light having a wavelength being different from a wavelength of the optical signal;
   an optical multiplexer to generate and output a multiplexed signal light by multiplexing the optical signal and the monitoring light;
   an optical relay transmission path to amplify and transmit the multiplexed signal light with a Raman amplification effect exerted by pumping light output from a pumping light source to be used for distributed Raman amplification;
   an optical demultiplexer to demultiplex the multiplexed signal light transmitted through said optical relay transmission path for every wavelength and to output the optical signal separated from the monitoring light;
   an optical signal receiver to receive the optical signal output from said optical demultiplexer; and
   a pumping light source stopping device to continuously monitor a transmission state of the monitoring light and, when the transmission of the monitoring light is interrupted, to stop emission of the pumping light from said pumping light source to be used for distributed Raman amplification, and the pumping light source stopping device comprises:
   an optical branching device to optically branch the multiplexed signal light;
   a monitoring light passing filter to pass the monitoring light included in the branched multiplexed signal light and remove the optical signal components therein;
   a monitoring light detector to receive passing light having passed through said monitoring light passing filter, and to detect the monitoring light by demodulating the received passing light into the electrical monitoring signal; and
   a controller to turn off said pumping light source when the monitoring light is not detected.

2. The optical transmission system according to claim 1, wherein the optical signal transmitter generates and outputs the optical signal by modulating a specified carrier light wave that have a specified wavelength with a specified electrical signal; and
   wherein the monitoring light transmitter generates and outputs the monitoring light by modulating an additional carrier light wave having a wavelength being different from the specified wavelength of the carrier light wave with an electrical monitoring signal having a frequency being lower than that of the specified electrical signal.

3. The optical transmission system according to claim 1, wherein said optical relay transmission path comprises:
   an optical fiber to transmit the multiplexed signal light;

said pumping light source to generate the pumping light to be used for distributed Raman amplification; and an optical multiplexing/demultiplexing unit to supply the pumping light output from said pumping light source to said optical fiber.

4. A pumping light source stopping device to be used in an optical transmission system comprising:

an optical signal transmitter to output an optical signal;

a monitoring light transmitter to output a monitoring light having a wavelength being different from a wavelength of the optical signal;

an optical multiplexer to generate and output a multiplexed signal light by multiplexing the optical signal and the monitoring light;

an optical relay transmission path to amplify and transmit the multiplexed signal light with a Raman amplification effect exerted by pumping light output from a pumping light source to be used for distributed Raman amplification;

an optical demultiplexer to demultiplex the multiplexed signal light transmitted through said optical relay transmission path for every wavelength and to output the optical signal separated from the monitoring light; and an optical signal receiver to receive the optical signal output from said optical demultiplexer, the pumping light source stopping device to continuously monitor a transmission state of the monitoring light and, when the transmission of the monitoring light is interrupted, to stop emission of the pumping light from said pumping light source to be used for distributed Raman amplification, and the pumping light source stopping device further comprises:

an optical branching device to optically branch the multiplexed signal light;

a monitoring light passing filter to pass the monitoring light included in the branched multiplexed signal light and remove the optical signal components therein;

a monitoring light detector to receive passing light having passed through said monitoring light passing filter, and to detect the monitoring light by demodulating the received passing light into the electrical monitoring signal; and a controller to turn off said pumping light source when the monitoring light is not detected.

5. The pumping light source stopping device according to claim 4, wherein the optical signal transmitter generates and outputs the optical signal by modulating a specified carrier light wave that have a specified wavelength with a specified electrical signal; and wherein the monitoring light transmitter generates and outputs the monitoring light by modulating an additional carrier light wave having a wavelength being different from the specified wavelength of the carrier light wave with an electrical monitoring signal having a frequency being lower than that of the specified electrical signal.

6. The pumping light source stopping device according to claim 4, wherein said optical relay transmission path comprises: an optical fiber to transmit the multiplexed signal light; said pumping light source to generate the pumping light to be used for distributed Raman amplification; and an optical multiplexing/demultiplexing unit to supply the pumping light output from said pumping light source to said optical fiber.

7. An optical transmission system comprising:

n-pieces of optical signal transmitters being mounted in a manner to correspond to n-pieces of channels in a one-to-one relationship, said n-pieces of optical signal transmitters which each generate and output an optical signal by modulating a corresponding one of carrier light waves which have different wavelengths and are assigned to said channels in a one-to-one relationship, each with a corresponding electrical signal;

at least one monitoring light transmitter to generate and output a monitoring light by modulating an additional carrier light wave having a wavelength being different from each of wavelengths of the carrier light waves with an electrical monitoring signal;

an optical multiplexer to generate and output a multiplexed signal light by multiplexing the optical signals corresponding to said n-pieces of channels and the monitoring light;

an optical relay transmission path to amplify and transmit the multiplexed signal light with a Raman amplification effect exerted by pumping light output from a pumping light source to be used for distributed Raman amplification;

an optical demultiplexer to demultiplex the multiplexed signal light transmitted through said optical relay transmission path for every wavelength and to output separately the optical signals corresponding to said n-pieces of channels, separated from the monitoring light;

n-pieces of optical signal receivers each being mounted in a manner to correspond to each of n-pieces of channels in a one-to-one relationship, said n-pieces of optical signal receivers which each receive the corresponding optical signal output from said optical demultiplexer and demodulate the received optical signal into the corresponding electrical signal; and a pumping light source stopping device to continuously monitor a transmission state of the monitoring light and, when the transmission of the monitoring light is interrupted, to stop emission of the pumping light from said pumping light source to be used for distributed Raman amplification, and the pumping light source stopping device comprises:

an optical branching device to optically branch the multiplexed signal light;

a monitoring light passing filter to pass the monitoring light included in the branched multiplexed signal light and remove the optical signal components therein;

a monitoring light detector to receive passing light having passed through said monitoring light passing filter, and to detect the monitoring light by demodulating the received passing light into the electrical monitoring signal; and a controller to turn off said pumping light source when the monitoring light is not detected.

8. The optical transmission system according to claim 7, wherein said optical relay transmission path comprises:

an optical fiber to transmit the multiplexed signal light;

said pumping light source to generate the pumping light to be used for distributed Raman amplification; and an optical multiplexing/demultiplexing unit to supply the pumping light output from said pumping light source to said optical fiber.

9. The optical transmission system according to claim 7, wherein the electrical monitoring signal has a frequency being lower than that of the electrical signal carried by each of the carrier light waves.

10. A pumping light source stopping device to be used in an optical transmission system comprising:

n-pieces of optical signal transmitters being mounted in a manner to correspond to n-pieces of channels in a one-to-one relationship, said n-pieces of optical signal transmitters each generate and output an optical signal by modulating a corresponding one of carrier light waves which have different wavelengths and are assigned to said channels in a one-tone relationship, each with a corresponding electrical signal;

at least one monitoring light transmitter to generate and output a monitoring light by modulating an additional carrier light wave having a wavelength being different from each of wavelengths of the carrier light waves with an electrical monitoring signal;

an optical multiplexer to generate and output a multiplexed signal light by multiplexing the optical signals corresponding to said n-pieces of channels and the monitoring light;

an optical relay transmission path to amplify and transmit the multiplexed signal light with a Raman amplification effect exerted by pumping light output from a pumping light source to be used for distributed Raman amplification;

an optical demultiplexer to demultiplex the multiplexed signal light transmitted through said optical relay transmission path for every wavelength and to output separately the optical signals corresponding to said n-pieces of channels, separated from the monitoring light;

n-pieces of optical signal receivers each being mounted in a manner to correspond to each of the n-pieces of optical signal receivers channels in a one-to-one relationship, said n-pieces of optical signal receivers which each receive the corresponding optical signal output from said optical demultiplexer and demodulate the received optical signal into the corresponding electrical signal; and a pumping light source stopping device to continuously monitor a transmission state of the monitoring light and, when the transmission of the monitoring light is interrupted, to stop emission of the pumping light from said pumping light source to be used for distributed Raman amplification, and the pumping light source stopping device comprises:

an optical branching device to optically branch the multiplexed signal light;

a monitoring light passing filter to pass the monitoring light included in the branched multiplexed signal light and remove the optical signal components therein;

a monitoring light detector to receive passing light having passed through said monitoring light passing filter, and to detect the monitoring light by demodulating the received passing light into the electrical monitoring signal; and a controller to turn off said pumping light source when the monitoring light is not detected.

11. The pumping light source stopping device according to claim 10, wherein said optical relay transmission path comprises:

an optical fiber to transmit the multiplexed signal light; said pumping light source to generate the pumping light to be used for distributed Raman amplification; and an optical multiplexing/demultiplexing unit to supply the pumping light output from said pumping light source to said optical fiber.

12. The pumping light source stopping device according to claim 10, wherein the electrical monitoring signal has a frequency being lower than that of the electrical signal carried by each of the carrier light waves.

13. A pumping light source stopping method to be used for an optical transmission system comprising:

n-pieces of optical signal transmitters being mounted in a manner to correspond to n-pieces of channels in a one-to-one relationship, said n-pieces of optical signal transmitters which each generate and output an optical signal by modulating a corresponding one of carrier light waves which have different wavelengths and are assigned to said channels in a one-to-one relationship, each with a corresponding electrical signal;

at least one monitoring light transmitter to generate and output a monitoring light by modulating an additional carrier light wave having a wavelength being different from each of wavelengths of the carrier light waves with an electrical monitoring signal;

an optical multiplexer to generate and output a multiplexed signal light by multiplexing the optical signals corresponding to said n-pieces of channels and the monitoring light; an optical relay transmission path to amplify and transmit the multiplexed signal light with a Raman amplification effect exerted by pumping light output from a pumping light source to be used for distributed Raman amplification;

an optical demultiplexer to demultiplex the multiplexed signal light transmitted through said optical relay transmission path for every wavelength and to output separately the optical signals corresponding to said n-pieces of channels, separated from the monitoring light;

n-pieces of optical signal receivers each being mounted in a manner to correspond to each of n-pieces of channels in a one-to-one relationship, said n-pieces of optical signal receivers which each receive the corresponding optical signal output from said optical demultiplexer and demodulate the received optical signal into the corresponding electrical signal; and the pumping light source stopping method comprising the steps of:

monitoring continuously a transmission state of the monitoring light and, and stopping emission of the pumping light from said pumping light source to be used for distributed Raman amplification, when the transmission of the monitoring light is interrupted, the stopping emission employing a pumping light source stopping device comprising:

an optical branching device to optically branch the multiplexed signal light;

a monitoring light passing filter to pass the monitoring light included in the branched multiplexed signal light and remove the optical signal components therein;

a monitoring light detector to receive passing light having passed through said monitoring light passing filter, and to detect the monitoring light by demodulating the received passing light into the electrical monitoring signal; and a controller to turn off said pumping light source when the monitoring light is not detected.

14. The pumping light source stopping method according to claim 13, comprising a step of judging that the transmission of the monitoring light is interrupted, when a received light is not demodulated into the electrical monitoring signal.

15. The pumping light source stopping method according to claim 13, wherein the electrical monitoring signal has a frequency being lower than that of the electrical signal carried, by each of the carrier light waves.

16. An optical transmission system comprising:

n-pieces of optical signal transmitting means being mounted in a manner to correspond to n-pieces of channels in a one-to-one relationship, said n-pieces of optical signal transmitting means which each generate and output an optical signal by modulating a corresponding one of carrier light waves which have different wavelengths and are assigned to said channels in a one-to-one relationship, each with a corresponding electrical signal;

at least one monitoring light transmitting means to generate and output a monitoring light by modulating an additional carrier light wave having a wavelength being different from each of wavelengths of the carrier light waves with a low frequency electrical monitoring signal;

an optical multiplexing means to generate and output a multiplexed signal light by multiplexing the optical signals corresponding to said n-pieces of channels and the monitoring light;

an optical relay transmission path to amplify and transmit the multiplexed signal light with a Raman amplification effect exerted by pumping light output from a pumping light source to be used for distributed Raman amplification;

an optical demultiplexing means to demultiplex the multiplexed signal light transmitted through said optical relay transmission path for every wavelength and to output separately the optical signals corresponding to said n-pieces of channels, separated from the monitoring light;

n-pieces of optical receiving means each being mounted in a manner to correspond to each of n-pieces of channels in a one-to-one relationship, said n-pieces of optical receiving means which each receive the corresponding optical signal output from said optical demultiplexing means and demodulate the received optical signal into the corresponding electrical signal; and a pumping light source stopping means to continuously monitor a transmission state of the monitoring light and, when the transmission of the monitoring light is interrupted, to stop emission of the pumping light from said pumping light source to be used for distributed Raman amplification, and the pumping light source stopping means comprises:

an optical branching means to optically branch the multiplexed signal light;

a monitoring light passing means to pass the monitoring light included in the branched multiplexed signal light and remove the optical signal components therein;

a monitoring light detector means to receive passing light having passed through said monitoring light passing filter, and to detect the monitoring light by demodulating the received passing light into the electrical monitoring signal; and a controlling means to turn off said pumping light source when the monitoring light is not detected.

17. The optical transmission system according to claim 16, wherein said optical relay transmission path comprises:

an optical fiber to transmit the multiplexed signal light;

said pumping light source to generate the pumping light to be used for distributed Raman amplification; and an optical multiplexing/demultiplexing means to supply the pumping light output from said pumping light source to said optical fiber.

18. The optical transmission system according to claim 16, wherein the low frequency is about 8 MHz.

\* \* \* \* \*